Figure 1:
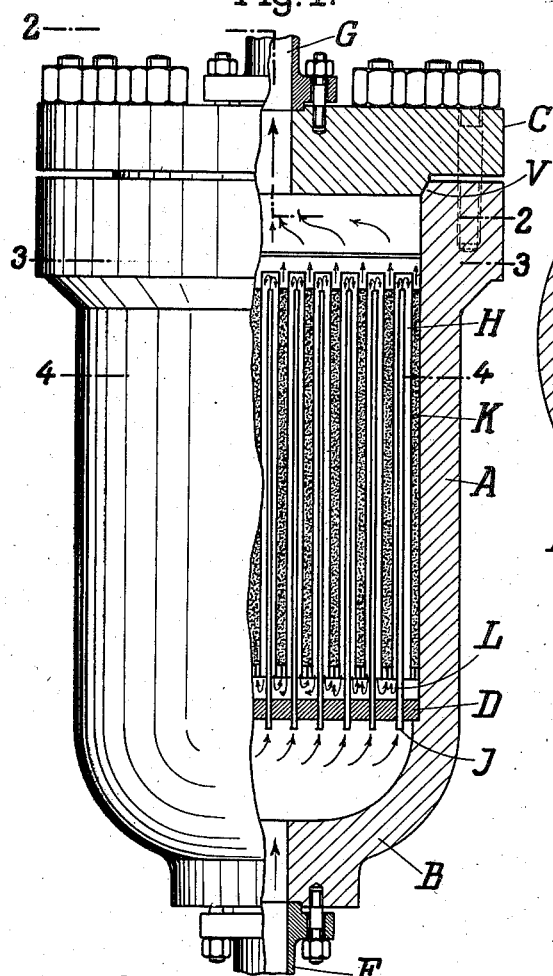

Aug. 25, 1936.   G. F. UHDE   2,052,326
CATALYTIC CONVERTER AND AMMONIA SYNTHESIS
Filed Sept. 30, 1926   2 Sheets-Sheet 1

Inventor:
Georg Friedrich Uhde
By: Marks & Clerk
Attys.

Patented Aug. 25, 1936

2,052,326

UNITED STATES PATENT OFFICE 2,052,326

CATALYTIC CONVERTER AND AMMONIA SYNTHESIS

Georg Friedrich Uhde, Bovinghausen, Germany, assignor, by mesne assignments, to American Cyanamid & Chemical Corporation, a corporation of Delaware Application September 30, 1926, Serial No. 138,749 In Germany October 2, 1925

6 Claims. (Cl. 23—289)

The present invention relates to the catalytic production of ammonia by the direct synthesis of hydrogen and nitrogen. Its object is to obviate the superheating of the catalyst under the influence of high concentrations of ammonia by balancing the heat.

When a mixture of nitrogen and hydrogen is conducted under pressure and at an elevated temperature over a catalyst, the quantity of the produced ammonia is increased to an extent corresponding to the velocity of the gases and the capacity up to a certain amount from the beginning of the contact to the end of it. This increase in concentration of the ammonia however is not uniform in such manner, that in reaching the middle of the mass of catalyst one half of the ammonia is produced, but on the contrary much more than the half of the whole ammonia is formed when the mid-point of the catalyst mass has been reached. The generation takes place rapidly at first, so that after passing over a proportionally small part of the catalyst the greatest percentage of the whole ammonia has been generated.

As the generation of ammonia is an exothermic reaction, also the development of heat takes place in the same manner according to the course in the generation of ammonia as above specified. Therefore, if heat be not eliminated, a certain increase in temperature over the initial temperature or the initial point of contact with the catalyst would correspond to a certain concentration of ammonia or to the single points of the contact, where the ammonia is produced. If now the gas is passed with a certain initial temperature, corresponding to the activity of the catalyst, over the latter in the first part, a rapid generation of ammonia takes place and the temperature is raised to a corresponding degree. In consequence of the higher temperature produced by the reaction, also the balance of ammonia or in other words the possibility of generating ammonia would be deferred to the unfavourable side. For instance a further formation of ammonia would be impossible and a utilization of the last parts of the catalyst could not be obtained, in case where the concentration of ammonia already formed is equal to the balance at such higher temperature.

For the purpose of obviating this drawback, it has heretofore been tried to cool the reacting gases in the back part of the catalyst mass in such a manner that fresh cold gas is introduced into pipes surrounded by the contact mass according to the system of counter-currents. By this means a better but relatively imperfect utilization of the contact may be realized. If, by regulating the size of the pipes and calculating the temperature of the entering fresh gas, the end of the catalyst mass is cooled only in such a degree, that it is maintained effective, the temperature of the gas becomes so much elevated, that it cannot further act as cooling agent in the middle part of the catalyst. An accumulation of heat and a damage to the catalyst would be the result. If, on the contrary, the entering fresh gas has a lower temperature so that it effects a greater cooling on the middle of the catalyst mass the back part of the catalyst is so greatly cooled down, that not much ammonia is generated and the catalyst therefore remains ineffective.

According to the present invention these drawbacks are obviated by repeatedly cooling down the fresh gas introduced in counter-current into the front and middle part of the catalyst, where it has already assumed a higher temperature. By this method the fresh gas is again capable of absorbing further heat from the hot catalyst, so that an accumulation of heat in the middle of the catalyst mass is obviated. This kind of cooling according to the present invention is simply attained by providing pipes of smaller diameter in the pipes for the admission of fresh gas in counter-current to the gases passing through the catalyst. The cold fresh gas first enters the cooling pipes of smaller diameter in a direction contrary to the direction in the larger pipes. The direction of the flow is therefore the same as that in which the gas passes through the catalyst, whereas the pipes of larger diameter are passed by the gas in opposite direction. The gases therefor move in a double counter-current.

The transfer of heat is therefor done in the following way:

The entering fresh gas first absorbs heat from the already preheated fresh gas during its passage through the inner pipes; after having entered the larger pipes and after having changed its direction the slightly preheated fresh gas effects a moderate cooling of the catalyst in the last part of the contact, besides it is newly cooled down by the fresh gas circulating in opposite direction in the inner pipes and is therefor able to exert a sufficient cooling action in the middle part of the catalyst mass. After having been cooled down by the fresh gas entering into the inner pipes to a temperature, favourable for the starting of the reaction, it enters the catalyst after having changed its direction a second time and effects a uniform generation of ammonia over the whole mass of catalyst by virtue of its right temperature, without provoking the above cited drawback.

There being a number of pipes, it will thus be seen that the invention comprises a process in which a plurality of separated but continuous streams of a reaction gas mixture are passed within a continuous body of catalyst, the flow of each stream being so arranged that the portion which is in the larger pipe is in direct heat exchanging relation with a later, or succeeding, portion of the same stream which is in the inner pipe. The temperature, and consequently the cooling effect of this outer portion is therefore continuously modified throughout its length by heat exchange with the colder succeeding portion in the inner pipe, while the latter is preheated to the same extent. Since the gas in the outer pipe is in direct heat exchanging relation with the catalyst, the process may therefore be defined as one in which a reaction gas mixture is passed first in indirect heat exchanging relation with a catalyst, then in direct heat exchanging relation with the same catalyst but in an opposite direction, and then through and in contact with the catalyst itself in a direction opposite to that of its flow when in direct heat exchanging relation therewith.

The correct maintenance of the temperatures in the different parts of the catalyst chamber is obtained by choosing in a corresponding manner the proportion of the total diameter and the diameter of the two surrounding rows of pipes and by first raising the fresh gas before its entering into the chamber to a temperature suitable for executing the process and accommodated to the chamber used.

According to the invention the heat generated under high pressure during the catalyzed reaction of nitrogen and hydrogen is eliminated or drawn off in the simplest possible manner or utilized, it is therefore possible to work with concentrations of ammonia, approaching the balance at low temperatures amounting over 10 volume percent. It is a known fact, that the balance of ammonia at low temperatures is more favourable than at high temperatures. It is therefore possible to obtain volume concentrations higher than 10% by employing a contact mass efficient at a low temperature and at pressures below 100 atmospheres. By the exothermic reaction heat is liberated offering great difficulties to the execution of such catalyzed action. By the method above described and the apparatus for executing such method the gases are guided in a double counter-current for absorbing and radiating the heat, so that the former difficulties have been overcome.

The new method is executed in an apparatus for instance constructed according to the annexed drawings.

Figure 2:
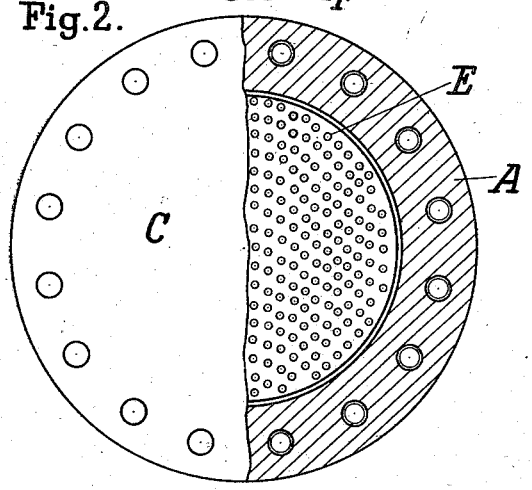
Figure 3:
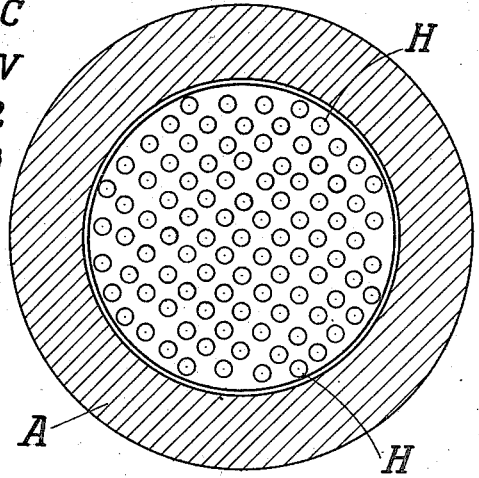
Figure 4:
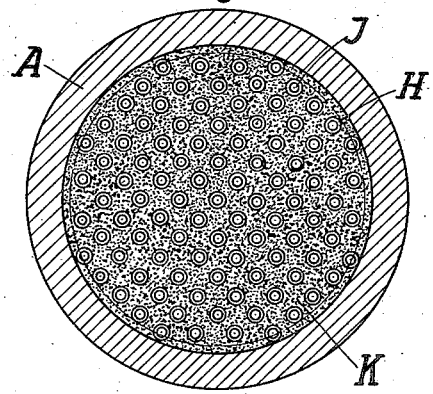

Figure 1 shows a side view and a part of the apparatus in longitudinal section, whereas Figures 2, 3 and 4 represent cross sections according to lines 2—2, 3—3 and 4—4 of Figure 1.

Figure 5:
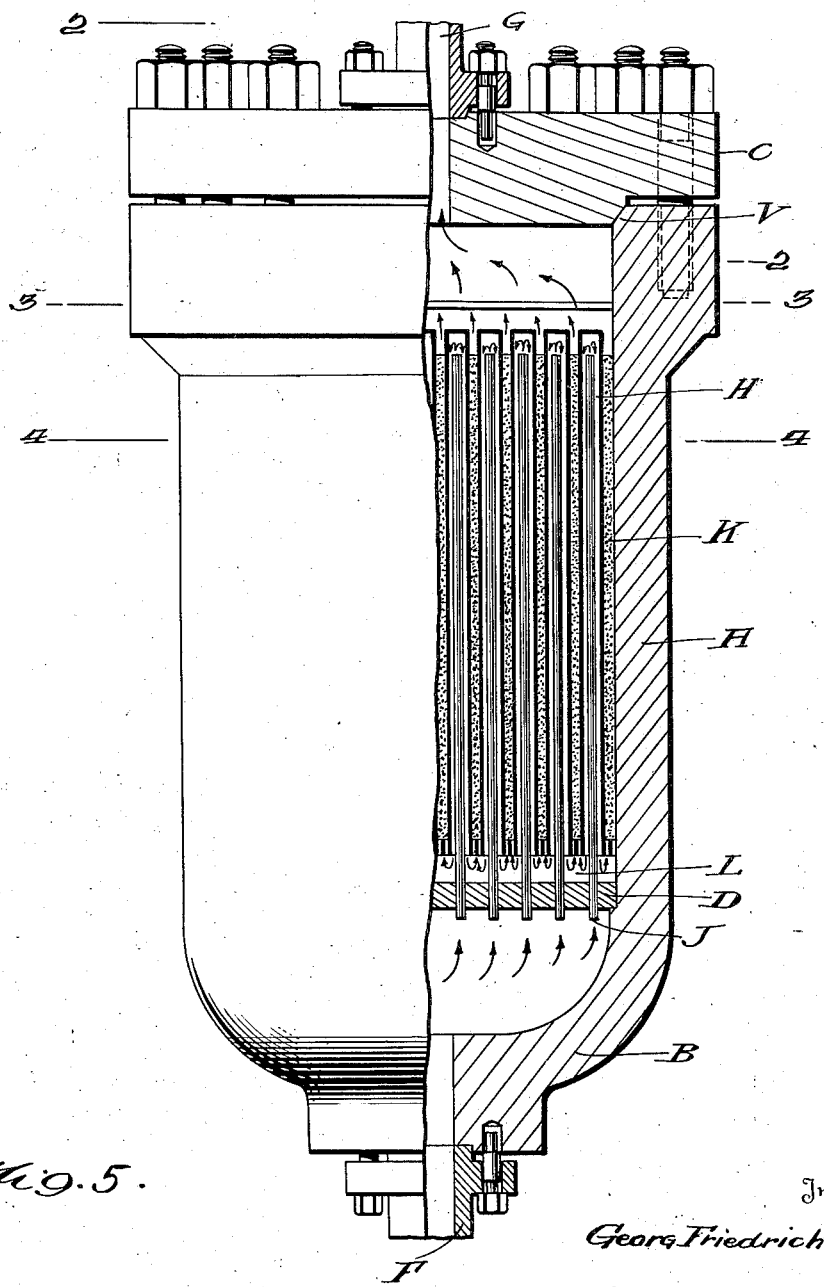

Figure 5 is an enlarged view of Figure 1, showing the arrangement of pipes 4 and 5.

The apparatus consists of a forged gas tight iron cylinder A, closed at its upper end by a cover C suitably provided with a conical locking device V into which by a likewise gastight pipe F the gas at the bottom B enters. In the apparatus near its bottom there is provided a metal plate D, in which a great number of pipes J are inserted by rolling. Around these inner pipes J other pipes H of greater diameter are arranged which are closed at their upper ends. The gas to be treated first enters the pipes J, is therein lifted upwardly, changes its direction at the end of the wider pipes H, leaves the latter at their lower most points L and penetrates into the contact mass K surrounding the pipes H. The finished reaction mixture leaves the contact mass at its highest level, passes then through the sieving plate E and is led off through the pipe G. The outer diameter of the inner pipes is for instance 15 mm., whereas the inner diameter of the outer pipes is 20 mm.

From the drawings it will be seen, that the gas entering through the pipe F is distributed into the inner pipes and thereafter conveyed back in the outer pipes, whereby the heat generated in the contact chamber is drawn off. The heated gases leave the outer pipes and pass the catalyst mass in opposite direction, whereafter they will leave the apparatus through the pipe G.

I claim:

1. Apparatus for synthesizing ammonia comprising a chamber adapted to contain a mass of catalyst, said chamber having an inlet for nitrogen-hydrogen mixture and an outlet for reaction products, a plurality of outer tubes disposed in said chamber, the upper ends thereof being closed and the lower being directly open to the catalyst but not in communication with the inlet, and each of said tubes being provided with an inner tube of smaller diameter, the upper ends of said inner tubes being in communication with the upper end of the outer tubes and the lower ends of said inner tubes being in communication with the said inlet whereby entering gaseous mixture first passes through the inner tubes in one direction, then traverses the outer tubes in the opposite direction and then passes directly into contact with catalyst material disposed in said chamber in the same direction as that of the first passage.

2. Catalytic apparatus comprising in combination a catalytic chamber, at least one catalyst layer therein, heat exchanging elements at least partially embedded in the catalyst layer, means for causing reaction gases to circulate through the heat exchanging elements in indirect heat exchanging relation with the catalyst, means for causing the gases to reverse their flow in the heat exchanging elements and to pass in reverse flow through portions of the elements in direct heat exchanging relation with the catalyst, and means for deflecting gases issuing from the heat exchanging elements directly through the catalyst in a direction opposite to that of their first reverse flow.

3. Catalytic apparatus comprising in combination a catalytic chamber, a catalyst layer therein, heat exchanging elements in said chamber and at least partly embedded in the catalyst, means for introducing a plurality of reaction gases, at least one of said gases being passed through the heat exchanging elements in indirect heat exchanging relation with the catalyst, means for reversing the flow of the reaction gas in the heat exchanging elements and for causing the gas to flow through a portion of the heat exchanging elements in direct heat exchanging relation with the catalyst, and means for causing all of the reaction gases after issuing from the heat exchanging elements to reverse their flow and thereupon pass directly through the catalytic layer.

4. In the catalytic production of ammonia from nitrogen-hydrogen mixtures, the method of avoiding local superheating of the catalyst which comprises passing the nitrogen-hydrogen mixture in a plurality of separated and confined streams within but not in direct contact with a catalyst layer, each stream passing first in direct heat exchange relation and in countercurrent flow with preceding portions thereof, then reversing its flow and passing out of contact but in direct heat exchange relation with the catalyst mass and with succeeding portions as aforesaid, and thereupon passing the mixture through and in contact with the catalyst layer in a direction opposite to that of its flow when in direct heat exchange relation therewith.

5. In the catalytic production of ammonia from nitrogen-hydrogen mixtures, the method of avoiding local superheating of the catalyst which comprises maintaining a flow of the mixture within but not in direct contact with a catalyst layer, the gases passing first in direct heat exchanging relation and in countercurrent flow with the flow of preceding portions thereof, then reversing their flow and passing out of contact but in direct heat exchanging relation with the catalyst mass and with succeeding portions as aforesaid and thereupon passing the mixture through and in contact with the catalyst layer in a direction opposite to that of its flow when in direct heat exchange relation therewith.

6. Catalytic apparatus comprising in combination a catalyst chamber, a catalyst layer therein, and heat exchange elements at least partially embedded in said catalyst layer, said heat exchange elements comprising outer tubes open at one end to the catalyst for passing a flow of reaction gases through the tubes in one direction and through the catalyst in the opposite direction and inner tubes located within said outer tubes for carrying a flow of relatively cold gases to modify the cooling effect of the gas in the outer tubes.

GEORG FRIEDRICH UHDE.